June 1, 1943.                J. FLETCHER                2,320,920
                            WELDING ELECTRODE
                         Filed March 14, 1942
FIG.1.                              FIG.2.
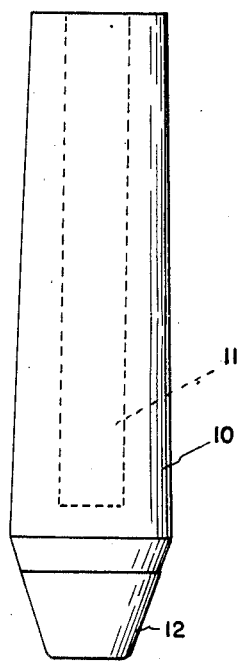  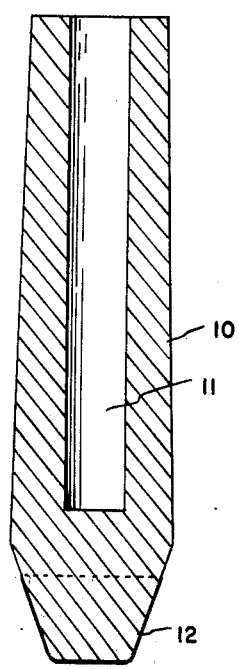
INVENTOR.
JAMES FLETCHER
BY
ATTORNEYS Patented June 1, 1943

2,320,920

UNITED STATES PATENT OFFICE 2,320,920

WELDING ELECTRODE

James Fletcher, Detroit, Mich., assignor to Tipaloy, Inc., Detroit, Mich., a corporation of Michigan Application March 14, 1942, Serial No. 434,750

2 Claims. (Cl. 219—4)

The present invention relates to the art of spot welding and more specifically to the welding of metals which have previously been coated with another metal.

In the production of many articles of metal, such as steel and iron, it is often highly desirable that they be plated with a metal that is less susceptible to the action of moist air and, in the case of the ferrous metals, the coating metal is most often zinc.

Further, after the steel parts have been produced and zinc coated, it often becomes necessary to spot weld together some of such parts. This operation, however, when carried on with the usual electrode of copper or cuprous alloy, while making a more or less satisfactory weld, results in a discolored spot and also results in rapid deterioration of the electrodes. This seems to be due to an interchange of copper and zinc, with some of the copper passing to the welded spot, or about its edges, and some of the zinc passing over to the electrode.

After a comparatively few welds, it is necessary to remove the contact surface of the electrodes by means of a file or the like, since they become roughened, apparently due to the combination with the copper of some of the zinc, and therefore do not properly operate.

Among the objects of the present invention is to prevent this interchange of metal and thereby provide a much longer life of the electrodes, beside improving the appearance of the weld.

With this and other objects in view, the invention consists in providing the electrodes with a protective coating of a metal which under welding conditions has little or no affinity for the zinc or its vapor, and which itself does not vaporize during the welding operation.

Excellent results have been obtained by providing tips of copper alloy with a coating of silver or chromium which extends over the point and up the side walls for a short distance. In case silver is the coating material, the entire tip may be coated, but with chromium, it is preferred to have no coating at the upper portion where the tip enters the holder.

The thickness of the coating is not critical, but with chromium or other metal less conductive than the tip metal, it is preferred that the coating be quite thin so as not to build up a resistance to the electric current. Since silver has a higher conductivity than the copper alloy and is somewhat softer, it is preferred to make the coating somewhat thicker.

The coatings are preferably applied by electroplating the coating metal upon the tip or tip end portion and in the case of the less conductive metals, may be only a flash plate.

In using the coated tips for welding zinc coated ferrous metal, a great many welds may be made without dressing since the only deposit thereon is easily removable by wiping with a cloth.

While silver and chromium have been mentioned as specific examples, it is obvious that other coating metals may be used provided they have the characteristics mentioned.

In the accompanying drawing which illustrates by way of example a tip embodying the present invention.

Figure 1 is a view in elevation of a tip, and
Figure 2 is a longitudinal section thereof.

In these figures, the tip body 10 may be of any suitable alloy of copper with other metal or metals, such for example as that described and claimed in my United States Patent No. 2,212,017, issued August 20, 1940.

The tip may be of the usual form having the water passage 11 and is shown as coated at 12 with one of the metals indicated.

Now having described the invention and the preferred embodiment thereof, it is understood that said invention is to be limited, not to the specific details herein set forth, but only by the scope of the claims which follow:

I claim:

1. A welding electrode consisting of a copper alloy having a thin adherent coating of silver covering the welding face thereof and extending a substantial distance up the sides thereof.

2. A spot welding electrode consisting chiefly of copper and having its welding tip and lower side walls electroplated with silver.

JAMES FLETCHER.